United States Patent [19]

Fresne et al.

[11] Patent Number: 4,769,944

[45] Date of Patent: Sep. 13, 1988

[54] GRAFTING MACHINE

[75] Inventors: Jean-Louis Fresne, Rilly La Montagne; Alain Collas, Verzenay; Georges Vesselle, Tours Sur Marne, all of France

[73] Assignee: Groupement Champenois d'Exploitation, France

[21] Appl. No.: 80,826

[22] Filed: Jul. 24, 1987

[51] Int. Cl.$^4$ .............................................. A01G 1/06
[52] U.S. Cl. .................................................... 47/6
[58] Field of Search ................ 47/6, 5.5, 7, 8, 1; 156/304.5, 258; 144/90–91

[56] References Cited

U.S. PATENT DOCUMENTS

| | | | |
|---|---|---|---|
| 3,680,255 | 8/1972 | Grigorov | 47/6 |
| 3,969,843 | 7/1976 | Wahler et al. | 47/6 |
| 4,654,999 | 4/1987 | Raggett | 47/6 |

FOREIGN PATENT DOCUMENTS

| | | | |
|---|---|---|---|
| 2602316 | 7/1977 | Fed. Rep. of Germany | 47/6 |
| 2455426 | 1/1981 | France | 47/6 |
| 2555403 | 5/1985 | France | 47/6 |

Primary Examiner—Robert A. Hafer
Assistant Examiner—Danton D. DeMille
Attorney, Agent, or Firm—Berman, Aisenberg & Platt

[57] ABSTRACT

The grafting machine comprises two assemblies, namely a top assembly 4 and a bottom assembly 3, mounted on two guide columns 2 joined at the bottom to a base 21 and at the top to a brace 5; the top assembly 4 has a scraper blade 12 associated with a cutter blade 14 for the stock, which is inserted into a centering V 8 situated at the top of the bottom assembly 3, which in its bottom part has two cutter blades 9 which, on the operation of the machine, are applied against a scion support 6 in which a scion is received in a central groove 16, the scion support being disposed on the base 21 together with a locking stop 7 facing it, one on each side of the two guide columns 2.

13 Claims, 3 Drawing Sheets

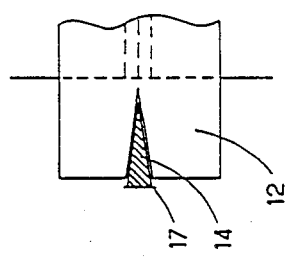
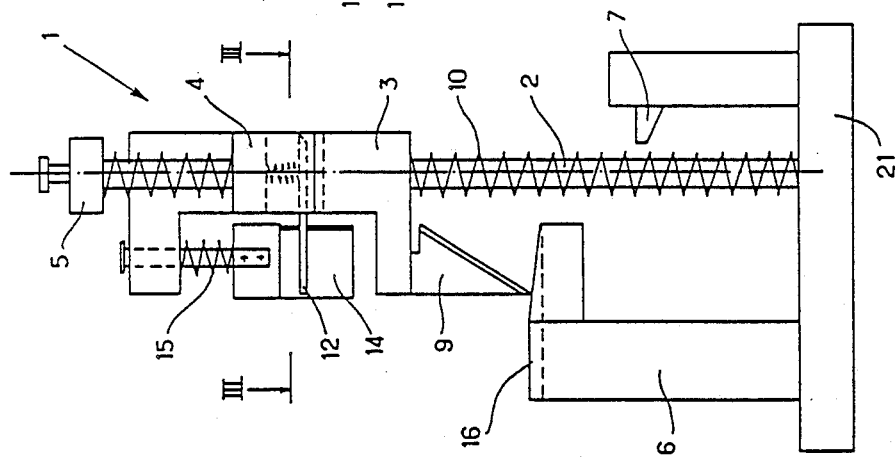
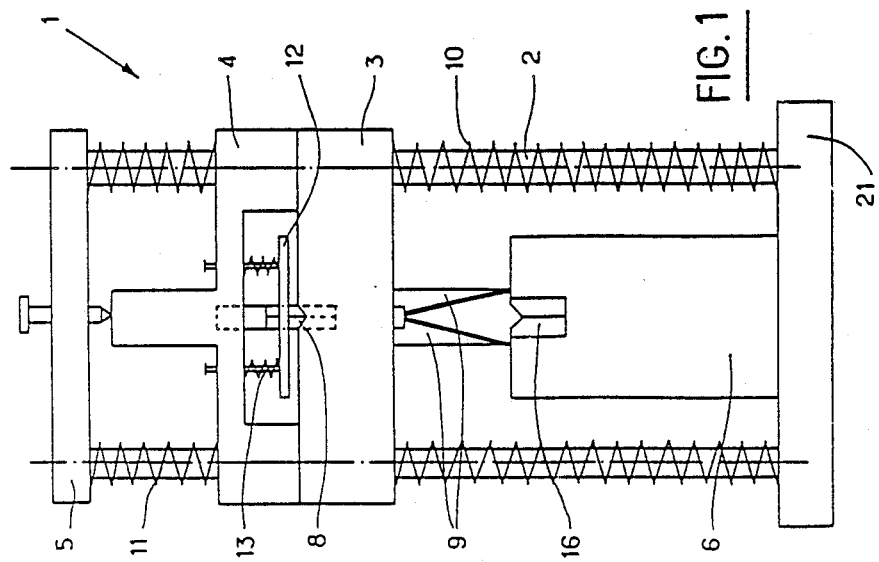

GRAFTING MACHINE

The present invention relates to a grafting machine and particularly to a machine mechanically making a green wood graft. It is well known that grafting is a necessary operation for the culture of certain plants, such as the vine, fruit trees, rose trees, tomato and other plants.

At the present time this grafting operation is carried out on material lignified during the winter rest, either manually or mechanically. On the one hand there is the scion carrying the buds, and on the other hand the stock which has or will have the roots. The development of new technologies, such as clonal selection and invitro culture, make it possible to obtain vegetable material throughout the year and a better quality than traditional productions. Moreover, production rates are very high. This material cannot be planted direct for reasons of resistance to certain diseases or for production reasons, and it must therefore be grafted.

This new type of grafting is at present effected manually with very low production rates and very relative precision. The stock and the scion are in fact of very small dimensions, having, for example, a diameter of the order of 1.5 to 2 millimeters, and this work is difficult to carry out. It is therefore necessary to develop and machine enabling this grafting to be done in order to produce high-quality plants with a high production rate if this new technology is to be economically viable.

The invention relates to a grafting machine which eliminates manual grafting and ensures good bonding between scion and stock.

The machine according to the present invention makes it possible to carry out mechanically the grafting operation with high production rates, while respecting technical prerequisites in respect of quality.

The grafting principle applied in the machine according to the present invention is based on tapered cut grafting.

The machine according to the present invention makes it possible to cut the scion, to cut the stock, and to join the two parts.

The tapered cut of the scion is made with two blades having a determined shape, position and inclination in order to make a perfect, clean cut enabling the most regular sizing possible. The accuracy with which these operations are carried out is very important for ensuring that contacts between the tissues of the two parts are as perfect as possible. This is the factor of prime importance for the graft to succeed.

The stock is cut by a blade forming a slit, which must always be in the middle of the stem and which has a constant depth. In addition, this blade has a special shape making it possible to open out the two parts of the stem to enable the tip of the scion to be embedded in the stem of the stock.

The accuracy with which these operations are carried out is of prime importance. It is in fact necessary for the tissues of the scion to be in perfect contact with those of the stock in order to facilitate the formation of the callus, an essential factor for a successful graft.

The invention therefore proposes a machine for grafting a scion on a stock, which comprises in combination:

a frame providing at the bottom with a base supporting two guide columns, and at the top with a brace for the transverse adjustment of the distance between said columns;

a scion support and a locking stop which are disposed one on each side of the two guide columns and are fixed on said base;

two superposed treatment assemblies mounted for sliding and independently on the guide columns of the frame in the inoperative position; the top assembly is held against the bottom assembly by two elastic means connected to the brace and disposed on said guide columns, while the bottom assembly is held by two other elastic means mounted on the two guide columns and connected to the base; the top assembly has in its interior a scraper plate fastened to two elastic means and a stock cutter device carried by said scraper plate, while the bottom assembly has in its top part a stock receiver coinciding with the cutter device of the top assembly, and in its bottom part a scion cutter device likewise disposed in vertical alignment with the stock receiver, the relationship between the two assemblies in the operative position being such that after insertion of the stock into the stock receiver of the bottom assembly the cutter device of the top assembly will make an incision in the stock, the two assemblies are lowered with the aid of a manipulating means, the cutter device of the bottom assembly makes the tapered cut on the scion and is stopped by the locking stop, so that the top assembly is thus immobilized at the scion support and the stock in which the incision has been made is secured to the scion, whereupon the two assemblies are returned with the aid of the manipulating means to the inoperative position for a further grafting cycle.

The present invention also relates to the following characteristics, considered separately or in all their technically possible combinations:

the stock cutter device is a blade of triangular shape carrying at its end a stop for determining the length of the cut;

the stock cutter blade is mounted for sliding, with a spring return means, in the top assembly;

the scion cutter device consists of two opposite blades fastened to one another and each having the shape of an inverted pyramid whose cutting edges directly face one another;

the scion cutter blades have a single taper;

the stock receiver is a central groove provided in the center of the top of the bottom assembly, the scraper plate bearing against said groove for the positioning of the stock;

the scion support receiver is a centering V into which the scion is inserted;

the manipulating means consists of a pedal and a cable;

the top assembly has the shape on an inverted U;

the elastic means are springs;

the diameter of the scion is between 1 and 10 millimeters;

the tapered cut made by the two cutter blades of the bottom assembly is made at a height between 5 and 10 millimeters;

the angle of the scion tip is between $16 \pm 4°$;

the stock cutter device is a blade of triangular shape or any other equilvalent means making it possible to form a slit and to open out the two parts and hold them in a V-shape in order to make the insertion.

Various advantages and characteristics of the present invention will emerge from the detailed description given below with reference to the accompanying drawings, in which;

FIG. 1 is a front view of the grafting machine;

FIG. 2 is a side view of the grafting machine shown in FIG. 1;

FIG. 3 is a partial section taken on the line III—III in FIG. 2;

Figure 4:
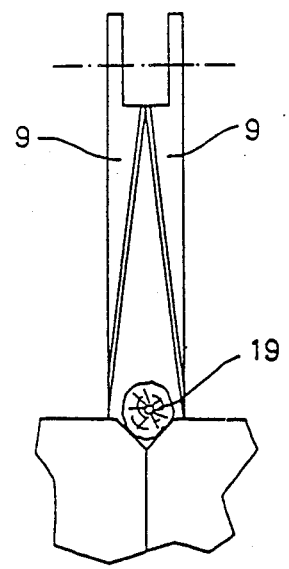
FIG. 4 illustrates the relationship between the scion cutter device and the scion inserted into the receiver of its support.
Figure 5:
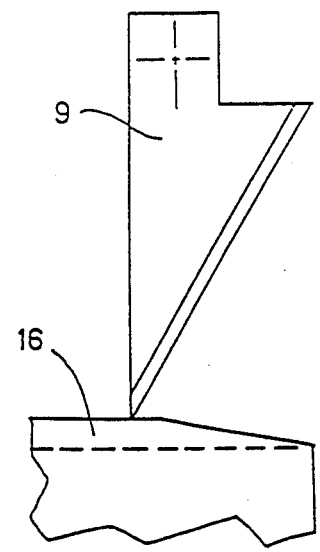
FIG. 5 shows the direction of movement of the blades of the scion cutter device and the cutting angle of said blades.
Figure 6:
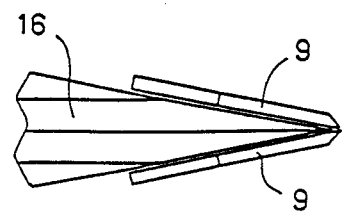
FIG. 6 illustrates one method of carrying out the operation of making the tapered cut with the blades of the scion cutter device.
Figure 7:
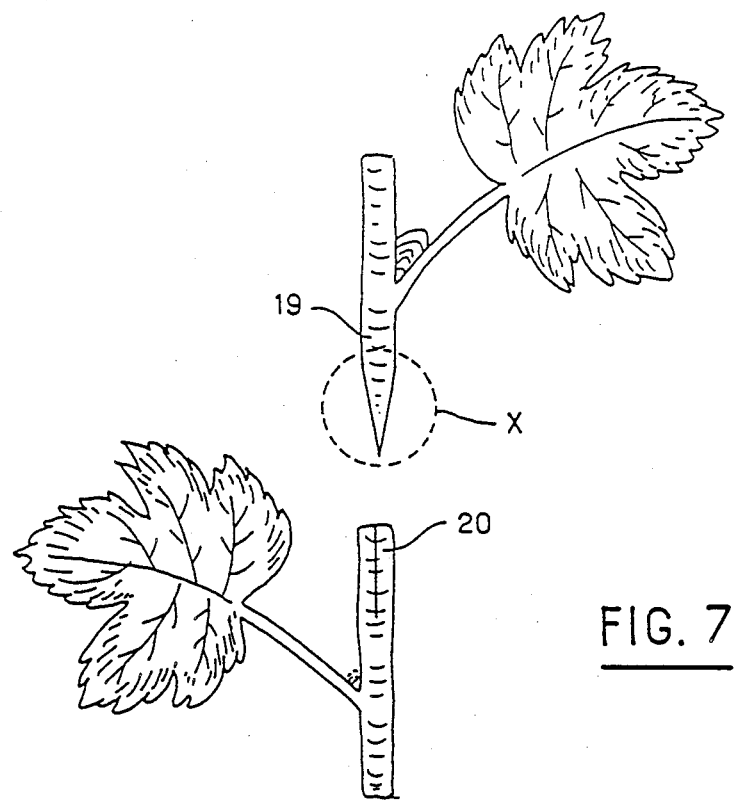
FIG. 7 shows a scion and a stock which are to be joined together.
Figure 8:
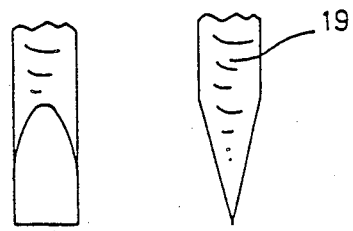
FIG. 8 shows a detail of the part X ringed by a broken line in FIG. 7.

In the accompanying drawings, in which like reference numerals designate like parts, the machine according to the present invention comprises a frame given the general reference 1. The frame has a base 21 supporting two columns 2, on which two independent assemblies 3 and 4, the bottom and top assemblies respectively, are adapted to slide. The distance between the two columns is maintained at the top by a brace 5. The scion support 6 and a stop 7 are fixed on the base 21, one on each side of the two columns 2.

The bottom assembly 3 sliding on the two columns 2 is provided in its top with a stock receiver 8 in the form of a centering groove in which the stock 20 will be positioned. This bottom assembly 3 also carries two blades 9 which make the cut on the scion 19. These blades 9 have an operating position enabling a perfect tapered cut to be made. This bottom assembly 3 is held in the top position by elastic means (two springs) 10 mounted on the guide columns 2 and connected to the base 21. In its bottom part it is provided with the two blades 9, which are disposed in vertical alignment with the centering groove 8 in which the stock 20 rests.

The top assembly 4 sliding on the two columns 2 is independent of the bottom assembly 3. It is held against the latter by means of elastic means (two springs) 11, which are also mounted on the two guide columns 2 and connected to the brace 5. The assembly 4 is provided with a scraper plate 12 and a blade 14. The scraper plate 12 mounted on the elastic means (spring) 13 serves on the one hand for the correct positioning of the stock in the centering groove 8 before the incision is made in the latter, and on the other hand for scraping the blade 14 on the insertion of the scion 19 into the stock 20. Because of its triangular shape, the blade 14 makes the incision in the stock 20 and opens this incison in such a manner as to enable the scion to be introduced into the stock 20. This blade 14 is mounted for sliding with return by the elastic means (spring) 15 in the top assembly 4. The top assembly as shown in FIG. 1 has the shape of an inverted U, although it is quite obvious that a different suitable shape could be used. The support 6 has at its top a scion receiver 16 in the form of a centering V, in which the scion 19 is received. The support 6 is fixed on the base 21 on each side of the two guide columns 2, opposite the locking stop 7 of the machine. In an embodiment illustrated in the drawings the support 6 serves, by means of its centering or V-shaped groove 16, as coacting blade for the blades 9 cutting the scion 19. The cutter assembly situated at the bottom of the bottom assembly 3 makes a tapered cut on the scion 19 disposed in the scion support 6 to a height between 5 and 10 millimeters, and the angle of the tip of the scion is between 14±2°.

A description is given below of the operation of the grafting machine according to the invention. To undertake grafting with the grafting machine according to the present invention, the scion 19 is positioned in its centering V 16. The stock 20 is inserted into its centering V 8 and is split on the blade 14. A stop 17 provided at the end of the blade 14 determines the length of the cut, the plate 12 being chamfered to facilitate the introduction of the stock 20. With the aid of a pedal and a cable (not shown in the accompanying drawings), the bottom and top assemblies 3, 4 are lowered, the blades 9 of the cutter device make the cut on the scion 19, and the blade 14 comes into contact with said scion 19. At that moment, while the two assemblies 3 and 4 continue to move downwards, the blade 14 becomes locked and will move no further and the stock 20 moves down along said blade 14, driven by the scraper 12, and the parts are opened out to receive the taper on the scion 19. At that moment the top and bottom assemblies 4 and 3 are locked by the stop 7. By means of the manipulation device in the form of a pedal and a cable the assembly 4 is raised, while the assembly 3 is held in its bottom position. The grafted plant is thereupon removed, and when the operating pedal is released the bottom assembly 3 will rise so that a second grafting operation can be started in accordance with the cycle indicated above.

We claim:

1. A machine for grafting a scion (19) to a stock (20), comprising in combination:

a frame (1) provided at the bottom with a base (21) supporting two guide columns (2), and at the top with a brace (5) for the transverse adjustment of the distance between said columns (2);

a scion support (6) and a locking stop (7) which are disposed one on each side of the two guide columns (2) and are fixed on said base (21);

two superposed treatment assemblies (3,4) mounted for sliding independently on the guide columns (2) of the frame (1); the top assembly (4) is held against the bottom assembly (3) by two elastic means (11) connected to the brace (5) and disposed on said guide columns (2), while the bottom assembly (3) is held by two other elastic means (10) mounted on the two guide columns (2) and connected to the base (21); the top assembly (4) has in its interior a scraper plate (12) fastened to two elastic means (13) and a stock (20) cutter device (14) carried by said scraper plate (12), while the bottom assembly (3) has in its top part a stock receiver (8) coinciding with the cutter device (14) of the top assembly (4), and in its bottom part a scion (19) cutter device (9) likewise disposed in vertical alignment with the stock (20) receiver (8), the relationship between the two assemblies (3,4) in the operative position being such that after insertion of the stock (20) into the stock receiver (8) of the bottom assembly (3) the cutter device (14) of the top assembly (4) will make an incision in the stock (20), the two assemblies (3,4) are lowered with the aid of a manipulating means, the cutter device (9) of the bottom assembly (3) makes the tapered cut on the scion (19) and is stopped by the locking stop (7), so that the top assembly (4) is thus immobilized at the scion support (16) and the stock (20) in which the incision has been made is secured to the scion (19), whereupon the two assemblies (3,4) are returned with the aid of the manipulating means to the inoperative position for a further grafting cycle.

2. The machine as claimed in claim 1, wherein the stock (20) cutter device (14) is a blade (14) of triangular shape carrying at its end a stop (17) for determining the length of the cut.

3. The machine as claimed in one of claim 1, wherein the stock (20) cutter blade (14) is mounted for sliding, with a spring return means (15), in the top assembly (4).

4. The machine as claimed in claim 1, wherein the scion (19) cutter device (9) consists of two opposite blades (9) having a single taper, fastened to one another and each having the shape of an inverted pyramid whose 4 cutting edges directly face one another.

5. The machine as claimed in claim 1, wherein the stock (20) receiver (8) is a central groove provided in the center of the top of the bottom assembly (3), the scraper plate (12) bearing against said groove for the positioning of the stock (20).

6. The machine as claimed in claim 1, wherein the scion (20) support (6) receiver (16) is a centering V into which the scion (20) is inserted.

7. The machine as claimed in claim 1, wherein all the movements are made by a single manipulation means.

8. The machine as claimed in claim 1, wherein the top assembly (4) has the shape of an inverted U.

9. The machine as claimed in claim 1, wherein the elastic means are springs (10, 11, 13).

10. The machine as claimed in claim 1, wherein the diameter of the scion (20) is between 1 and 10 millimeters.

11. The machine as claimed in claim 1, wherein the tapered cut made by cutter blades (9) of the bottom assembly (3) is made at a height between 5 and 10 millimeters.

12. The machine as claimed in claim 1, wherein the angle of the scion (19) tip is between $16\pm4°$.

13. The machine as claimed in any one of claims 1 to 7, wherein the stock (20) cutter device (14) is means to form a slit and to open out the two resulting parts and hold them in the form of a V in order to make the insertion.

* * * * *